United States Patent [19]

Iskiw et al.

[11] Patent Number: 4,490,885
[45] Date of Patent: Jan. 1, 1985

[54] FISH SCALER

[76] Inventors: Metro Iskiw, 9511-75 St., Edmonton, Canada, T6C 2H8; Alex Hadican, 8502-83 Ave., Edmonton, Canada, T6C 1B1

[21] Appl. No.: 573,372

[22] Filed: Jan. 24, 1984

Related U.S. Application Data

[63] Continuation-in-part of Ser. No. 342,183, Jan. 25, 1982, Pat. No. 4,432,117.

[51] Int. Cl.³ ............................................. A22C 25/02
[52] U.S. Cl. ......................................... 17/66; 30/169; 30/272 A
[58] Field of Search ......................... 17/64, 68, 69, 66; 30/272 A, 272 R, 169

[56] References Cited

U.S. PATENT DOCUMENTS 3,195,232  7/1965  Toth ............................. 30/272 R X
3,835,504  9/1974  Tripodi ................................ 17/66

Primary Examiner—Willie G. Abercrombie
Attorney, Agent, or Firm—Harold H. Dutton, Jr.; George H. Dunsmuir

[57] ABSTRACT

A fish scaler comprising a housing having a longitudinal axis, an electric motor mounted in the housing, a shaft in the housing driven by the motor, a blade holder pivotally mounted in and projecting from the housing and a scaling blade mounted on said blade holder, a transmission in the housing and connecting the motor shaft and the blade holder for changing rotary motion of the motor shaft into a generally circular motion of the scaling blade, the generally circular motion of the scaling blade having a generally smooth component along the longitudinal axis and an abrupt component transverse to the longitudinal axis, thereby imparting an improved scaling action to the scaling blade.

9 Claims, 6 Drawing Figures

FISH SCALER

CROSS REFERENCE TO RELATED APPLICATION

This application is a continuation-in-part of my copending application Ser. No. 342,283 filed Jan. 25, 1982, now U.S. Pat. No. 4,432,117.

This invention relates to a device for the scaling of fish. More particularly, this invention relates to an improved motor driven fish scaler.

BACKGROUND OF THE INVENTION

In general, motorized, manually operated fish scalers have been of the rotary type and include motors for driving or rotating a shaft and a toothed body or blade on the outer end of the rotating shaft for engaging and dislodging the fish scales. Examples of such rotary fish scalers are found in U.S. Pat. Nos. 2,835,919 issued to B. E. Colburn et al on May 27, 1958; 3,072,956 issued to W. Olrich on Jan. 15, 1963; and 3,328,834 issued to R. A. Pulcifer on July 4, 1967.

Not only do such prior art fish scalers tend to spray scales over a large area during use, but the scalers are relatively inefficient in terms of energy use. With many rotary scalers, a relatively small area of the blade contacts the fish at any one time.

For these reasons, persons scaling fish have most often resorted to the use of manual tools for scaling fish, and although the manual tools are relatively slow, they tend to be more efficient than previously available electrically operated scalers.

In my prior application, an improved motor driven fish scaler is disclosed which was provided with a scaling blade mounted on the end of a shaft drivingly connected to an electric motor. The scaling blade has a scaling edge transverse to the axis of the drive shaft so that actuation of the motor resulted in a reciprocating motion of the scaling blade toward and away from the body of the fish for dislodging the fish scales. This device was a significant improvement over the prior art manual or power operated fish scalers.

OBJECTS OF THE INVENTION

A primary object of the present invention is to provide an improved electrically powered and manually operated fish scaler.

Another object of the present invention is to provide an electric fish scaler which has a new, efficient and effective motion for dislodging fish scales.

A further object of this invention is to provide a fish scaler having a blade which moves in a generally circular path.

Still another object of this invention is to provide a new drive mechanism for a motorized fish scaler.

Yet another object of the present invention is to provide a motorized fish scaler having a transmission for imparting a generally circular motion to the scaling blade.

These and other objects and advantages of the present invention will become apparent from a further consideration of this invention in view of the following specification and claims when taken together with the accompanying drawings.

BRIEF DESCRIPTION OF THE INVENTION

The fish scaler according to the present invention includes a housing or casing having a generally longitudinal axis and a rotary, electric motor mounted in the housing. An electric cord leads from the motor to a source of electricity and an on/off switch is provided to control the operation of the motor.

The rotary output shaft of the motor generally lies along the longitudinal axis of the housing and has a worm gear mounted thereon. Offset to one side of the worm gear is a shaft which is mounted in the housing. This shaft serves to mount a gear and eccentric assembly. The gear is of the pinion type and adapted to engage the worm gear on the motor shaft. In this manner, the rotation of the motor shaft and worm gear causes rotation of the pinion gear on its mounting shaft.

Formed with (or connected to) the pinion gear is a circular eccentric or cam, the center of which is offset from the center of the pinion gear and which also rotates as the pinion gear rotates. A transmission arm is provided and extends longitudinally out of the housing, and carries on its distal end a scaling blade.

The transmission arm has an ovate slot formed in one end thereof for engaging the cam on the pinion gear. The slot on the transmission arm is elongated in a direction transverse to the longitudinal axis of the housing. The major axis of this slot is of a length greater than the diameter of the cam but slightly less than the total transverse movement of the cam, and the minor axis of the slot is of a length substantially equal to the diameter of the cam. A pivot pin is carried by the housing and engages a longitudinal slot in the transmission arm, near the midpoint thereof.

By virtue of this construction, the rotary motion of the cam causes both a longitudinal and a transverse motion of the scaling blade in such a manner as to cause the blade to circumscribe a generally circular path. The longitudinal travel of the blade is, however, smoother than the transverse travel of the blade, since the cam traveling in the slot in the transmission arm does not smoothly impart its transverse motion to the arm because of the elongate slot in which the cam travels. This lost motion connection also tends to cause the transverse motion of the scaling blade to be in a somewhat sudden or abrupt fashion which helps to dislodge the scales.

The overall result of this motion is a significantly improved fish scaling action of the scaling blade.

DESCRIPTION OF THE PREFERRED EMBODIMENTS

Figure 1:
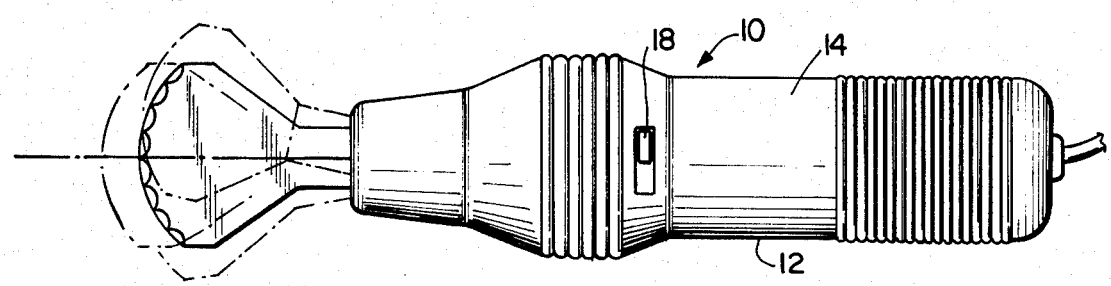
FIG. 1 is top plan view of a fish scaler showing the motion of the blade according to my invention.
Figure 2:
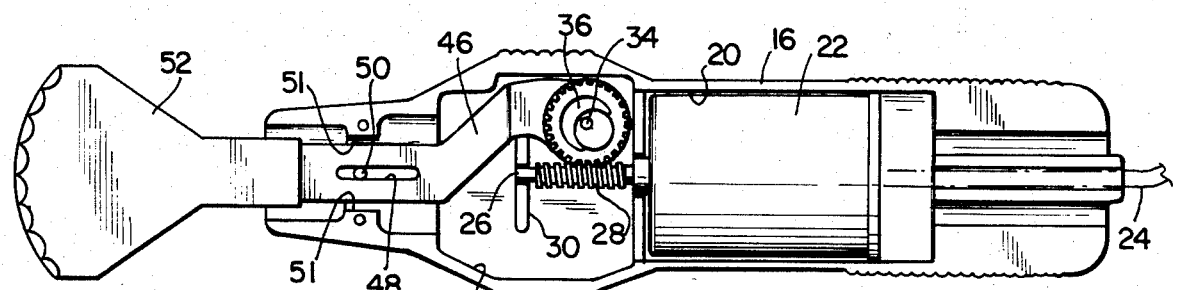
FIG. 2 is a slightly enlarged view of the fish scaler according to my invention with the top half of the housing removed.

Referring now to FIGS. 1 and 2, the fish scaler of the present invention generally designated 10 is seen to include an elongated casing or housing 12 which typically may be longitudinally split into top and bottom halves 14 and 16 for ease of construction, and secured together by screws in a conventional manner. The housing may be formed of molded plastic for example. The two halves 14 and 16 are essentially identical, except that one half is provided with a switch 18. Thus, the following description will concentrate on only one of the halves, except where differences are noted.

The housing 12 includes a cavity 20 formed therein to receive a rotary electric motor 22 connected to switch 18 and a source of electric power (not shown) by means of cord 24 in a known manner.

The output shaft 26 of motor 22 carries a worm gear 28 and is supported at its distal end on a bearing block 30 located in an enlarged, central cavity 32 in the housing 12. In this manner, the axis of the output shaft of the motor 22 and the worm gear 28 are essentially coincident with the longitudinal axis of the housing 12.

Laterally offset from the worm gear 28 and motor shaft 26 is a pinion gear mounting shaft 34 positioned in an appropriate recess (not shown) in each housing half 14 and 16. A pinion gear and eccentric (or cam) assembly 36 is mounted on shaft 34 for rotation thereon, and in such a manner as to engage the worm gear 28.

Figure 3:
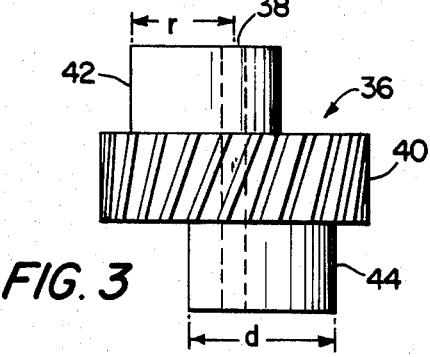
FIG. 3 is a side view of the drive gear and cam of my invention.
Figure 4:
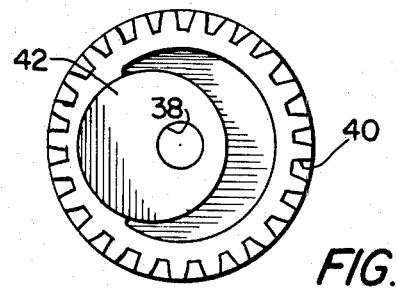
FIG. 4 is a top view of the drive gear and cam of FIG. 3.
Figure 5:
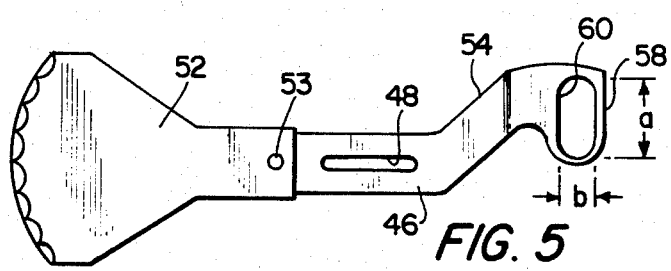
FIG. 5 is a top plan view of the scaling blade and arm according to my invention.
Figure 6:
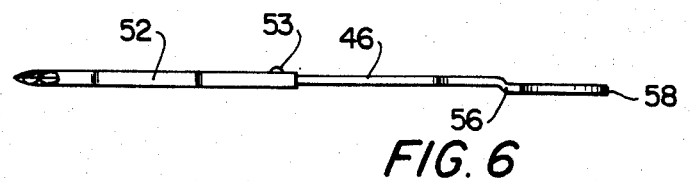
FIG. 6 is a side view of the scaling blade and arm of FIG. 5.

As seen in FIGS. 3 and 4, the pinion gear and cam assembly 36 includes a central bore 38, a pinion gear 40 and upper and lower eccentrics 42 and 44 respectively. The assembly is rotatably positioned on the shaft 34 by means of the shaft 34 passing through the bore 38. The two eccentrics 42 and 44 are diametrically opposed to each other in order to help balance the rotational mass of the assembly and thereby minimize the vibration transmitted to the user.

The two eccentrics 42 and 44 are essentially circular and each have a diameter "d".

Mounted in the forward extension of the housing 12 is an arm 46, the arm having a longitudinally extending slot 48 therein. The slot 48 is positioned on a pin 50 which acts as a pivot for the arm 46, so that the arm 46 may move longitudinally with respect to the pin 48, but lateral movement of one end of the arm 46 pivots the arm about the pin 50.

Affixed to the distal end of the arm 46 is a scaling blade 52 which may be of any suitable configuration. However, the scalloped edges of the blade 52 as shown have proven to be a very suitable configuration for the blade. The blade 52 may be releasably secured to the arm 46 by means of a spring biased push button 53, if desired.

The arm 46 is provided with a lateral offset portion 54 and a vertical offset 56, both offsets being of such a proportion as to position the end 58 of the arm 46, and the slot 60 about the pin 34. In addition, molded bosses 51 serve to loosely guide the movement of the arm as it travels within the housing.

The end 58 of the arm 46 is provided with an elongate slot 60 of a generally circular configuration, with the major axis of the slot 60 being transverse, and the minor axis of the slot 60 being parallel, to the longitudinal axis of the motor shaft 26 and worm gear 28. The slot 60 is of a size such that the minor dimension "b" is substantially the same as the diameter "d" of the eccentrics 42 and 44, while the major dimension of the slot 60 is greater than the diameter "d" but less than twice the distance "r" of rotational offset of the cams 42 or 44. In other words, the major dimension "a" of the slot 60 is given by the expression:

$$d < a < 2r$$

while the minor dimension "b" of the slot 60 is given by the expression:

$$b = d$$

After the arm is positioned in the housing 12, the pinion gear/eccentric assembly 36 is placed on its mounting shaft 34 in such a manner that one of the eccentrics 42 or 44 lies within the slot 60. In this manner, as the worm gear 28 is rotated by the motor 22, it causes rotation of the pinion gear 40 which in turn causes the cams 42 and 44 to rotate. Since one of the cams 42 or 44 is engaged with the slot 60 in the arm 46, the movement of the cams is translated into movement of the arm.

Because of the relative dimensions of the slot 60 with respect to the arc circumscribed by the cam engaged in the slot, substantially the entire longitudinal component of the cam motion will be smoothly imparted to the blade 52, while the transverse component of the cam movement will be abruptly imparted to the blade 52. This abrupt change of direction greatly enhances the scaling action of the blade.

This motion of the blade is not, strictly speaking, truly circular or elliptical, but for the purposes of this application is described as being "generally circular". The movement of the blade is shown by the dotted line positions of FIG. 1, where three such positions are shown.

While this invention has been described as having certain preferred features and embodiments, it will be apparent that the invention is capable of still further modification and variation, and this application is intended to cover all modification, variations and adaptations which fall within the spirit of the inventive concept and the scope of the appended claims.

What I claim is:

1. A fish scaler comprising a housing having a longitudinal axis; motor means in said housing; shaft means in said housing driven by said motor means; blade holder means pivotally mounted in and projecting from said housing and scaling blade means mounted on said blade holder means; transmission means in said housing and connecting said shaft means and said blade holder means for changing rotary motion of said shaft means into a generally circular motion of said scaling blade, said generally circular motion of said scaling blade having a component along said longitudinal axis and a component transverse to said longitudinal axis.

2. A fish scaler as in claim 1 and wherein said transmission means comprises a worm gear mounted on said shaft means and pinion gear means mounted in said housing in engagement with said worm gear so that rotation of said worm gear results in rotation of said pinion gear means.

3. A fish scaler as in claim 2 and wherein said pinion gear means includes a pinion gear member and cam means rotatable with said pinion gear member.

4. A fish scaler as in claim 3 and wherein said blade holder means comprises an arm having an elongate slot substantially transverse to the longitudinal axis of said housing and said cam means being positioned in said slot.

5. A fish scaler as in claim 4 and wherein said cam means comprises a circular cam integral with said pinion gear member such that the center of said cam is offset from the center of rotation of said pinion gear member.

6. A fish scaler as in claim 5 and wherein said elongate slot has a major dimension substantially transverse to the longitudinal axis of said housing and a minor dimension substantially parallel to the longitudinal axis of said housing, and wherein said major dimension "a" is given by the expression $$d < a < 2r$$

and the minor dimension "b" is given by the expression $$b \cong d$$

wherein "d" is the diameter of said circular cam and "r" is the rotational offset of the circular cam.

7. A fish scaler as in claim 6 and wherein said arm includes a second elongate slot extending substantially parallel to the longitudinal axis of said housing and positioned near the midsection of said arm, and a pivot pin mounted in said housing and passing through said second elongate slot.

8. A fish scaler as in claim 2 and wherein said pinion gear means comprises a pinion gear member for engagement with said worm gear member and a pair of cam members mounted on opposite sides of said pinion gear member and oppositely disposed for rotation with said pinion gear member.

9. A fish scaler as in claim 1 and wherein said generally circular motion comprises a smooth longitudinal component and an abrupt transverse component.

* * * * *